US009656335B2

(12) United States Patent
El-Wardany et al.

(10) Patent No.: US 9,656,335 B2
(45) Date of Patent: May 23, 2017

(54) BROACH TOOL RAKE FACE WITH A TAILORED SURFACE TOPOGRAPHY

(71) Applicant: United Technologies Corporation, Hartford, CT (US)

(72) Inventors: Tahany I. El-Wardany, Bloomfield, CT (US); Wayde R. Schmidt, Pomfret Center, CT (US)

(73) Assignee: United Technologies Corporation, Farmington, CT (US)

( * ) Notice: Subject to any disclaimer, the term of this patent is extended or adjusted under 35 U.S.C. 154(b) by 207 days.

(21) Appl. No.: 14/200,853

(22) Filed: Mar. 7, 2014

(65) Prior Publication Data

US 2014/0255112 A1     Sep. 11, 2014

Related U.S. Application Data

(60) Provisional application No. 61/775,128, filed on Mar. 8, 2013.

(51) Int. Cl.
| | | |
|---|---|---|
| *B23D 43/00* | (2006.01) | |
| *B23D 43/02* | (2006.01) | |
| *B23P 15/42* | (2006.01) | |
| *B23F 21/26* | (2006.01) | |
| *B23F 21/24* | (2006.01) | |

(52) U.S. Cl.
CPC .............. *B23D 43/02* (2013.01); *B23P 15/42* (2013.01); *B23D 2043/025* (2013.01); *B23F 21/24* (2013.01); *B23F 21/26* (2013.01); *Y10T 407/16* (2015.01)

(58) Field of Classification Search
CPC ...... B23F 21/24; B23F 21/241; B23F 21/243; B23F 21/245; B23F 21/246; B23F 21/248; B23F 21/26; B23F 21/262; B23F 21/264; B23F 21/266; B23F 21/268; B23D 37/00; B23D 43/00; B23D 43/02; Y10T 407/16; Y10T 407/1614; Y10T 407/1628; Y10T 407/1642; Y10T 407/1657; Y10T 407/1671; Y10T 407/1685

USPC ............................ 407/13–19; 76/101.1–119

See application file for complete search history.

(56) References Cited

U.S. PATENT DOCUMENTS

| | | | | |
|---|---|---|---|---|
| 2,274,491 A | * | 2/1942 | Mentley .................. | B23F 21/28 407/27 |
| 2,636,327 A | * | 4/1953 | Stephan .................... | B23Q 1/26 29/445 |
| 2,846,193 A | * | 8/1958 | Chadderdon ........... | E21B 29/00 166/55.7 |
| 3,227,008 A | * | 1/1966 | Celovsky ............... | B23D 43/00 219/69.17 |
| 3,461,748 A | * | 8/1969 | Meyer .................. | B23D 37/005 407/17 |
| 4,383,784 A | * | 5/1983 | Gulbrandsen ........... | B23P 15/32 408/144 |
| 4,826,365 A | * | 5/1989 | White ..................... | B23B 51/02 269/285 |

(Continued)

FOREIGN PATENT DOCUMENTS

| | | | | | |
|---|---|---|---|---|---|
| DE | 102009033619 A1 | * | 1/2011 | ........... | B23B 31/005 |
| FR | 2801234 A1 | * | 5/2001 | ........... | B23B 27/145 |
| GB | 2483475 A | * | 3/2012 | ............ | B23B 51/02 |

*Primary Examiner* — Daniel Howell
*Assistant Examiner* — Nicole N Ramos
(74) *Attorney, Agent, or Firm* — O'Shea Getz P.C.

(57) ABSTRACT

A broach tool includes a broach tool rake face with a tailored surface topography.

15 Claims, 9 Drawing Sheets

(56) References Cited

U.S. PATENT DOCUMENTS

| | | | |
|---|---|---|---|
| 5,160,232 A * | 11/1992 | Maier | B23B 51/02 |
| | | | 407/54 |
| 5,197,837 A | 3/1993 | Brown | |
| 5,246,320 A | 9/1993 | Krippelz, Jr. | |
| 5,396,818 A * | 3/1995 | Fitzgerald | B23D 43/04 |
| | | | 407/18 |
| 5,741,130 A | 4/1998 | Hagstrom et al. | |
| 6,047,430 A | 4/2000 | Redden | |
| 6,132,151 A | 10/2000 | Courmier | |
| 6,209,509 B1 | 4/2001 | Kammeraad et al. | |
| 6,470,846 B1 | 10/2002 | Kammeraad et al. | |
| 6,508,150 B1 * | 1/2003 | Bertschinger | C23C 28/044 |
| | | | 407/1 |
| 6,524,036 B1 * | 2/2003 | Kolker | B23B 27/143 |
| | | | 407/113 |
| 7,217,073 B2 | 5/2007 | Carpenter et al. | |
| 7,736,102 B2 | 6/2010 | El-Wardany et al. | |
| 7,805,824 B2 | 10/2010 | El-Wardany et al. | |
| 7,827,661 B2 | 11/2010 | El-Wardany et al. | |
| 8,000,942 B2 | 8/2011 | El-Wardany et al. | |
| 8,070,396 B2 | 12/2011 | Koskinen et al. | |
| 9,144,845 B1 * | 9/2015 | Grzina | B23B 27/00 |
| 2008/0229893 A1 * | 9/2008 | Shepard | B21D 37/01 |
| | | | 83/697 |
| 2013/0302102 A1 * | 11/2013 | Green | B23B 51/02 |
| | | | 408/144 |

\* cited by examiner

| Speed / Load | Low | Medium | High |
|---|---|---|---|
| Low | | | Regime I: seals, thrust bearings |
| Medium | | Regime II | |
| High | Regime III: piston-liner, transmission, bearings | | |

FIG. 6

| Texture (dimple) density | 7.5% | 15% | 30% |
|---|---|---|---|
| Low Speed | X | X | |
| Medium Speed | | X | |
| High Speed | | | X |

| Pattern and sliding directions | Depth (μm) | Radius (μm) | Area of a dimple (μm²) | Pitch (μm) | Area ratio (%) |
|---|---|---|---|---|---|
| Ellipse (circles pattern) | 8 | 75 | 17671 | 500 | 7 |
| Ellipse | 8 | 150/37.5 | 17671 | 500 | 7 |
| Triangle | 8 | 188 (slide length) | 17671 | 500 | 7 |

| Speed m/s | 0.1 | 0.2 | 1 | 2 |
|---|---|---|---|---|
| Texture shape | Circle | Triangle | Ellipse | Ellipse |

| | Method/Finishing | Shape | Orientation to sliding direction | Diameter/width (dimple) (μm) | Pitch (μm) | Depth (μm) | Ra (μm) |
|---|---|---|---|---|---|---|---|
| Pattern 1 | Machine process | Groove | Perpendicular | 500 | 1,000 | 45-50 | 0.54-0.67 |
| Pattern 2 | Machine process | Groove | Parallel | 500 | 1,000 | 45-50 | |
| Pattern 3 | Machine process | Mesh | | 500 | 1,000 | 45-50 | |
| Pattern 4 | Shot blast | Groove | Perpendicular | 60 | 90 | 6-10 | 0.04-0.08 |
| Pattern 5 | Shot blast | Groove | Parallel | 60 | 90 | 6-10 | |
| Pattern 6 | Shot blast | Dimple | | 60 | 90 | 6-10 | |
| Pattern 7 | Shot blast | Dimple | Rotating 45° | 60 | 90 | 6-10 | |
| Flat 1 | Polishing | | | | | | 0.04 |
| Flat 2 | Grinding | | | | | | 0.31 |

| Speed m/s | 0.1 | 0.2 | 0.5 | 1 |
|---|---|---|---|---|
| Texture shape | Pattern 6 | Pattern 6 | Pattern 6 | Pattern 3 |
| | | | Pattern 7 | Pattern 6 |

FIG. 9

BROACH TOOL RAKE FACE WITH A TAILORED SURFACE TOPOGRAPHY

This application claims priority to U.S. Patent Appln. No. 61/775,128 filed Mar. 8, 2013.

BACKGROUND

This present disclosure relates generally to a broach tool and methodology for designing broach tool rake surfaces.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The compressor and turbine sections include components that rotate at high speeds, which subject the components to significant centrifugal loads. One component that rotates at high speeds is a disk that carries multiple circumferentially arranged rotor blades. The blades are typically attached at an outer circumference of the disk through respective blade attachment slots. Each of the slots has a profile that corresponds with the root of the blade, and has a configuration designed to retain the blade in the slot. The blade attachments slots are generally of a "fir-tree" configuration to increase the load bearing surface area. Broaching is a process often utilized to machine the fir-tree slots.

Limitations of known broach processes associated with aerospace materials may include excessive material strain hardening, surface microstructure alteration (such as white etched layer and bend microstructures), slot deformation due to high friction forces affecting dimension accuracy of the slot, and ripple formation on the slot surfaces.

SUMMARY

A broach tool according to one disclosed non-limiting embodiment of the present disclosure includes a broach tool rake face with a tailored surface topography.

A further embodiment of the present disclosure includes, wherein the tailored surface topography is a laser surface treatment.

A further embodiment of any of the foregoing embodiments of the present disclosure includes, wherein the tailored surface topography is laser hardened.

A further embodiment of any of the foregoing embodiments of the present disclosure includes, wherein the tailored surface topography is formed by particles.

A further embodiment of any of the foregoing embodiments of the present disclosure includes, wherein the tailored surface topography is Electo-Discharge Machined.

A method for manufacturing a broach tool according to one disclosed non-limiting embodiment of the present disclosure includes identifying an application regime for which a tailored surface topography is to be used; determining the tailored surface topography for the application regime; and selecting an appropriate processing method to form the tailored surface topography.

A further embodiment of any of the foregoing embodiments of the present disclosure includes identifying a high speed, low load application regime relationship.

A further embodiment of any of the foregoing embodiments of the present disclosure includes identifying a high-medium speed and medium load application regime relationship.

A further embodiment of any of the foregoing embodiments of the present disclosure includes identifying a low-medium speed and high load application regime relationship.

A further embodiment of any of the foregoing embodiments of the present disclosure includes determining a shape factor for the tailored surface topography.

A further embodiment of any of the foregoing embodiments of the present disclosure includes determining a pitch, pattern design for the tailored surface topography.

A further embodiment of any of the foregoing embodiments of the present disclosure includes determining an orientation for the tailored surface topography.

A further embodiment of any of the foregoing embodiments of the present disclosure include selecting a high energy deposition method to form the tailored surface topography.

A further embodiment of any of the foregoing embodiments of the present disclosure include selecting a cold spray method to form the tailored surface topography.

A further embodiment of any of the foregoing embodiments of the present disclosure include selecting a kinetic metallization method to form the tailored surface topography.

A further embodiment of any of the foregoing embodiments of the present disclosure include selecting a plasma deposition method to form the tailored surface topography.

A further embodiment of any of the foregoing embodiments of the present disclosure include selecting an electron-beam based method to form the tailored surface topography.

A further embodiment of any of the foregoing embodiments of the present disclosure include alternating between subtractive and additive processing methods to form the tailored surface topography.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 6 is a table of the relationship between speed and load of the tailored surface topography;

FIG. 7 is a table of the relationship between speed and tailored surface topography density;

FIG. 8 is a table of the relationship between speed and tailored surface topography shape; and FIG. 9 is a table of the relationship between speed and tailored surface topography pattern.

DETAILED DESCRIPTION

Figure 1:
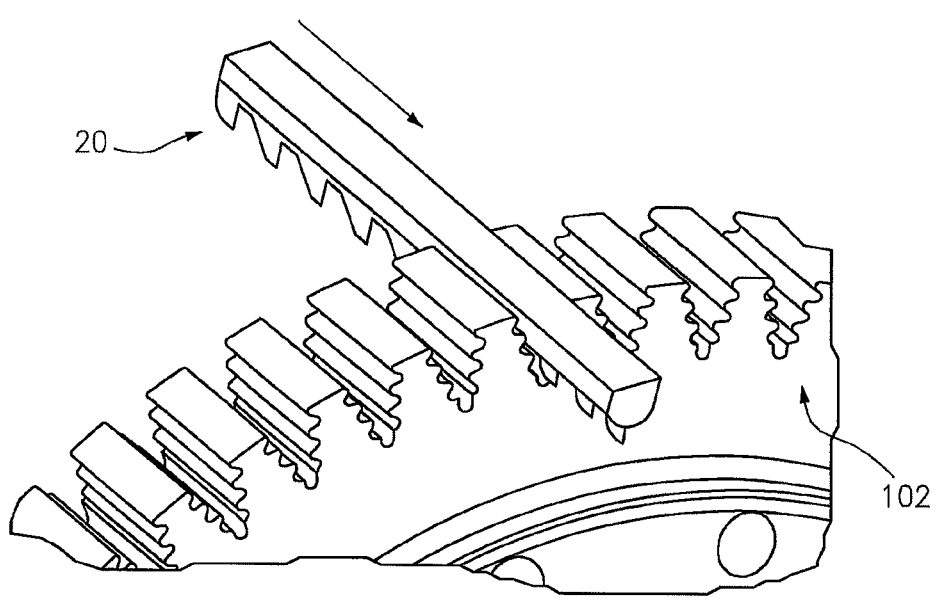
FIG. 1 is a schematic perspective view of a broach tool.
Figure 2:
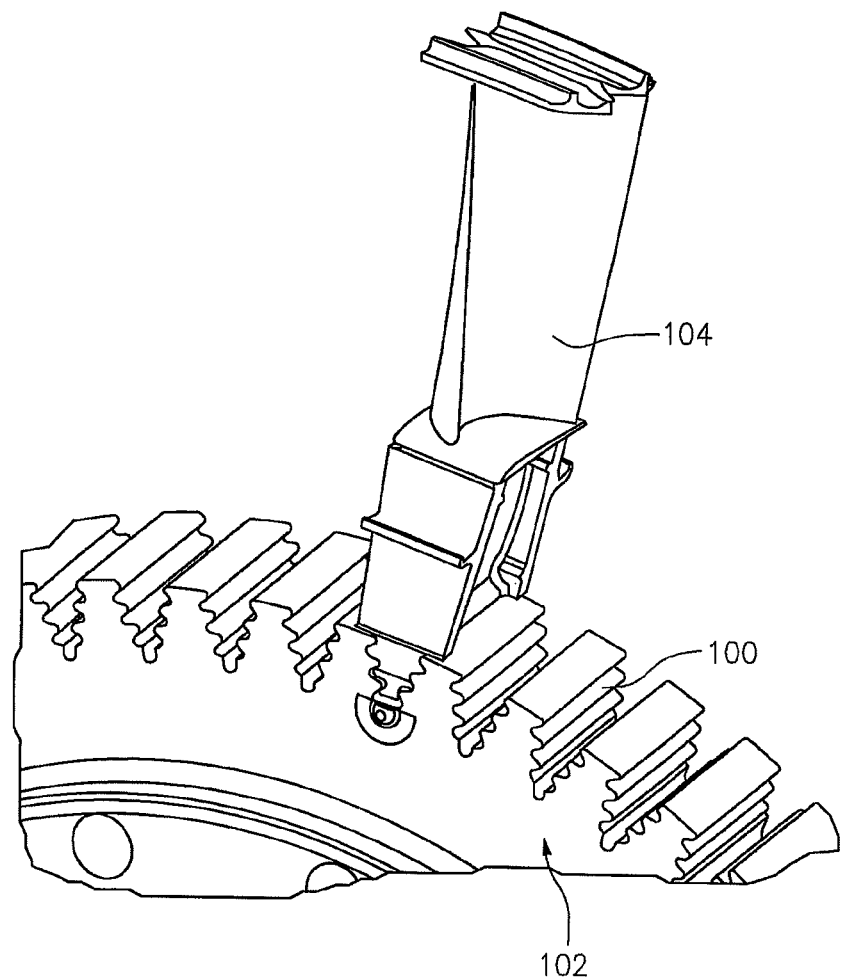
FIG. 2 is a schematic view of a rotor disk with broach machined fir-tree slots.

FIG. 1 schematically illustrates a broach tool 20 that may be utilized to, for example, broach machined fir-tree slots 100 in a disk 102 that is manufactured of, for example, an aerospace superalloy such as titanium (Ti), steel, and/or nickel (Ni) to receive a respective rotor blade 104 (one shown; FIG. 2). In a typical broaching process the broach tool 20 includes a series of cutting teeth that is pulled through a workpiece to remove material and form the desired slot. Each cutting tooth of the series of cutting teeth is typically slightly different from the adjacent cutting teeth, and the broach tool is designed to gradually remove material from the workpiece at an interface.

Figure 3:
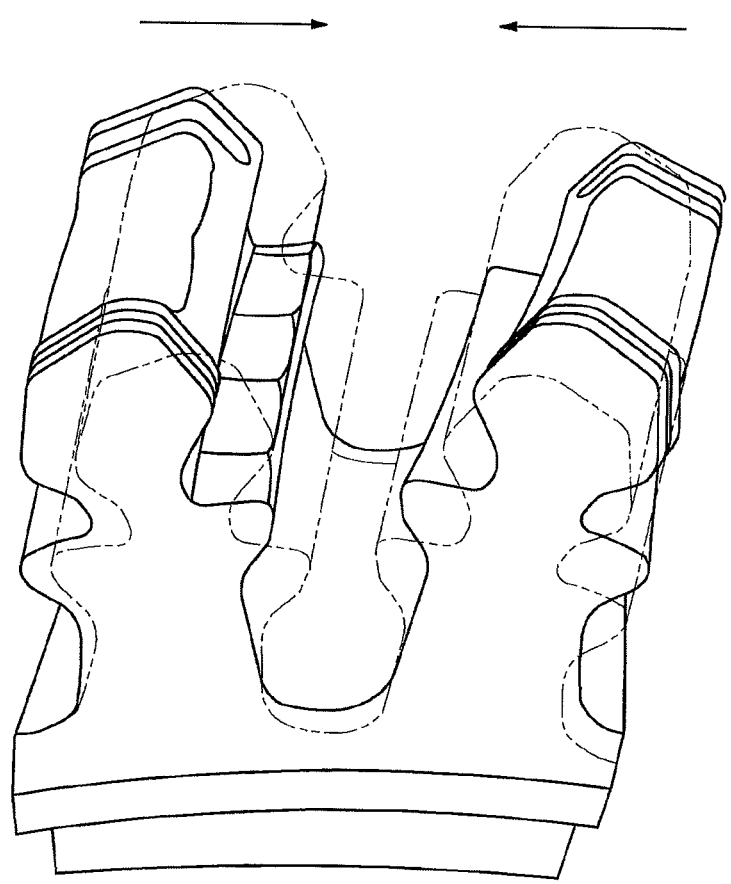
FIG. 3 is a schematic view of a broach machined fir-tree slot illustrating a deflection thereof during broaching.

Friction occurs at the interface between a rake face of the broach tool 20 and the chips generated during metal removal. The rake face friction may adversely influence the chip formation process and may consume about 25% of the total cutting energy. The amplitude of a normal force value depends to a great extent on the coefficient of friction between the broach tool and the chips or workpiece that may approach a value as high as 1 due to, for example, the lower feed rate (broach speed). While a main cutting force directional component has a major effect in the deformation of the broach tool teeth, the force perpendicular to the main cutting force directional component has a significant influence onslot deformation (FIG. 3). In particular, the broaching of aerospace material may experience relatively high forces in both the cutting and normal directions that may result in excessive material strain hardening, surface microstructure alteration and slot deformation, as well as reduce broach tool life due to premature (or excessive) teeth wear.

Figure 4:
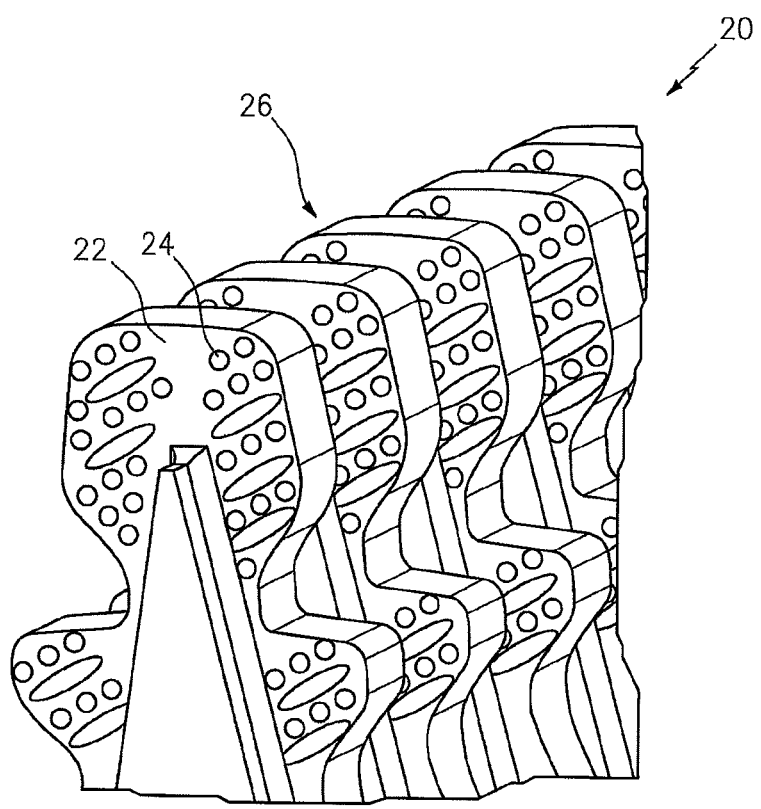
FIG. 4 is a face view of a broach tool with a tailored surface topography.

Application of a tailored surface topography 24 to a rake face 22 carried by each tooth 26 (FIG. 4) operates to reduce the coefficient of friction. This tailored surface topography 24 is selected to reduce the friction forces and reduce the potential for slot deformation, leading to a better control of slot geometry. In addition, the reduction of the friction force component will allow the broach tool 20 to be engaged with less strain to the workpiece material and will reduce the generated cutting force and consequently further reduce stress, strain and slot deflection.

Figure 5:
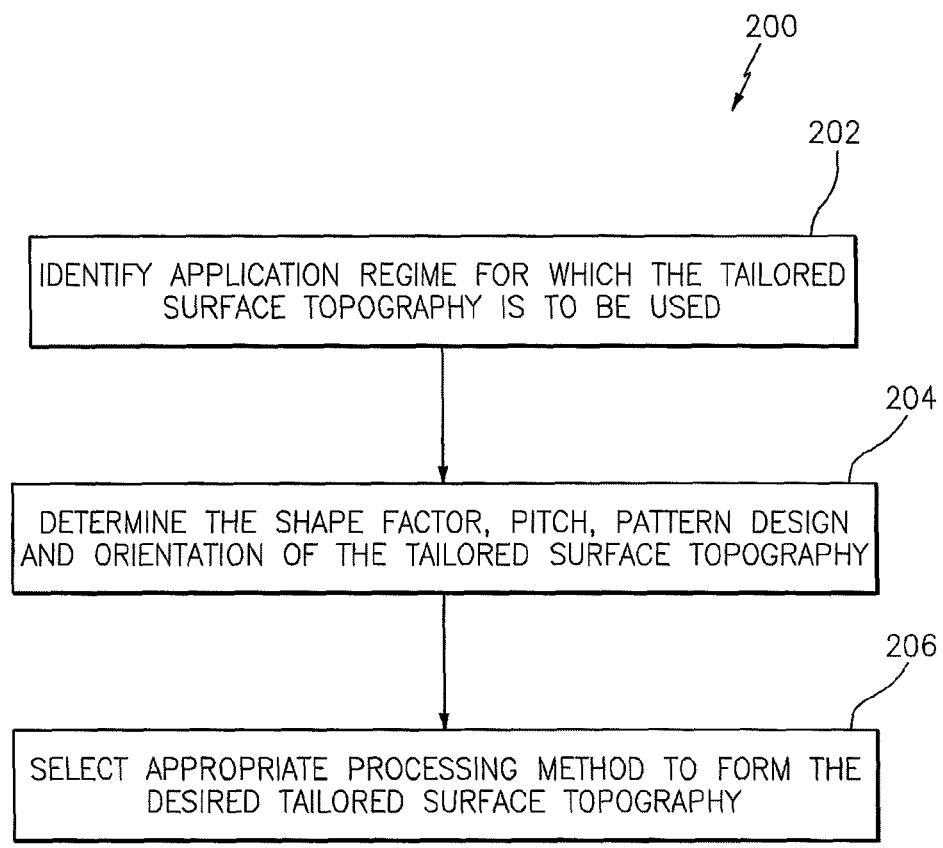
FIG. 5 is a method of determining a tailored surface topography.

With reference to FIG. 5, a method 200 to define the tailored surface topography 24 is related to the broaching speed and the generated load (FIG. 6). The method 200 facilitates the development of the tailored surface topography 24. That is, the predetermined broaching speed and the generated load defines the tailored surface topography 24.

Initially, an application regime relationship (Step 202; FIG. 5) for which the tailored surface topography 24 is to be used is selected. It should be appreciated that various regions may alternatively or additionally be defined. Regime I is identified as high speed, low load. The tailored surface topography 24 is thereby tailored primarily to control lubricant flow. Regime II is identified as high-medium speed and medium load, wherein the tailored surface topography 24 is thereby tailored primarily to control the combined effects of lubricant hydrodynamics and contact mechanics. Regime III is identified as low-medium speed and high load. The tailored surface topography 24 is thereby tailored primarily to control the combined effects of contact mechanics and lubricant compressibility to trap wear particles and control the friction coefficient. The tailored surface topography 24 can be formed though a combination of subtractive and additive processing methods, including, for example, surface texturing through change to the surface microstructure or chemistry. Non-limiting subtractive methods that involve use of thermal energy based removal processes to remove material include electrical discharge machining (EDM) and laser machining. For example, specially designed EDM die sinker media may be utilized to carbonize the broach tool rake face 22 of each tooth 26 to increase the surface hardness of the broach tool as well as to generate the desired surface textures. In another example, laser machining may also be used to alter the properties of the broach tool rake face 22 to resist failure during sliding contact. Laser texturing has demonstrated, through experimental verification, a one-third reduction in the coefficient of friction. In yet another example, ultrasonic impact machining induces sufficient kinetic energy into each individual impact element to generate both surface texture and sub-surface body deformations.

Next, the tailored surface topography 24 is determined (Step 204). The tailored surface topography 24 may be defined by, for example, shape, pitch, pattern design, density, orientation and others. Furthermore, the feature density (FIG. 7), shape (FIG. 8) and pattern (FIG. 9) of the tailored surface topography 24 may be related to broach tool speed based on the application regime.

The tailored surface topography 24 includes an array of features to retain lubricant or machining debris, e.g. depressed wells, microchannels, grooves, pockets, dimples, pyramids, ovals, etc., including combinations thereof. The array of features may also be provided to operate as a controlled heat transfer medium such as a heat sink. Experimental data may be utilized to facilitate the definition of the tailored surface topography 24.

Next, the appropriate processing method to form the determined tailored surface topography 24 is selected (Step 206). For example, laser surface treatments can be used to selectively ablate features from sub-micron to millimeter size. In addition to material removal, laser surface treatment may be used to selectively and locally induce desired additional hardness or compositional changes. Laser processes may also be used to deposit thin layers of complex features made from, for example, aluminum oxide, tungsten carbide particles or other characteristically hard or wear/abrasion resistant materials.

Other processing methods that may be used to selectively produce surface topography include high energy deposition methods such as cold spray or kinetic metallization, plasma deposition or electron-beam based methods. Such methods can be used in combination with appropriate masking to control the precise location of the surface structures.

Another processing method to form the determined tailored surface topography 24 includes Electrical-Discharge (die sinker) machining. In this method, a graphite, copper or other suitable electrode with a designed pattern is used to 'burn away' the features on the metal workpiece. With appropriate masking, selective etching may be used to form microstructural and composition changes in the broach tool rake face 22. It should be appreciated that various machine operations may alternatively or additionally be utilized.

Another processing method to form the determined tailored surface topography 24 includes 'soft lithographic' or direct write methods to selectively position features as small as several tens of nanometers. Again, with appropriate masking and subsequent processing (e.g. etching or thermal treatment), residual surface features may be defined on the broach tool rake face 22.

Yet other processing methods suitable for forming the determined tailored surface topography 24 include water-jet based processes. It should be appreciated that various other process methods will benefit herefrom.

The tailored surface topography 24 facilitates lubricant flow distribution, prevents seizure/scoring, reduces the coefficient of friction between tool surface and chips produced as well as extends the operational life of the broaching tool 30. The tailored surface topography 24 has demonstrated experimentally the reduction of slot deflection and surface strain to provide an approximate 50% reduction of the normal force component. The various tailored surface topography 24 configurations have been demonstrated via orthogonal machining application. The tailored surface topography 24 also reduces production costs by increasing the broach tool life since the cost of tooling is one of the major factors in the broaching process It should be understood that like reference numerals identify corresponding or similar elements throughout the several drawings. It should also be understood that although a particular component arrangement is disclosed in the illustrated embodiment, other arrangements will benefit herefrom.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method for manufacturing a broach tool comprising:
identifying an application regime for which a tailored surface topography is to be used;
determining the tailored surface topography for the application regime, the tailored surface topography including a combination of depressed wells, microchannels, grooves, pockets, dimples, pyramids, and ovals to be formed in a broach tool rake face of the broach tool and selected to control a coefficient of friction between the broach tool rake face and a workpiece;
selecting an appropriate processing method to form the tailored surface topography in the broach tool rake face; and
forming the tailored surface topography in the broach tool rake face using the processing method.

2. The method as recited in claim 1, further comprising: identifying a high speed, low load application regime relationship.

3. The method as recited in claim 1, further comprising: identifying a high-medium speed and medium load application regime relationship.

4. The method as recited in claim 1, further comprising: identifying a low-medium speed and high load application regime relationship.

5. The method as recited in claim 1, further comprising: determining a shape factor for the tailored surface topography.

6. The method as recited in claim 1, further comprising: determining a pitch, pattern design for the tailored surface topography.

7. The method as recited in claim 1, further comprising: determining an orientation for the tailored surface topography.

8. The method as recited in claim 1, further comprising: selecting a high energy deposition method to form the tailored surface topography.

9. The method as recited in claim 8, further comprising: selecting a cold spray method to form the tailored surface topography.

10. The method as recited in claim 8, further comprising: selecting a kinetic metallization method to form the tailored surface topography.

11. The method as recited in claim 8, further comprising: selecting a plasma deposition method to form the tailored surface topography.

12. The method as recited in claim 8, further comprising: selecting an electron-beam based method to form the tailored surface topography.

13. The method as recited in claim 1, further comprising: alternating between subtractive and additive processing methods to form the tailored surface topography.

14. The method as recited in claim 1, further comprising: determining a density and a distribution of the pockets as a function of the broach tool speed based on the application regime.

15. The method as recited in claim 1, further comprising: determining at least one shape of the pockets based on the application regime and the processing method.

* * * * *